US008580140B2

US 8,580,140 B2

Nov. 12, 2013

(12) United States Patent
Jacobson et al.

(10) Patent No.: US 8,580,140 B2
(45) Date of Patent: Nov. 12, 2013

(54) CYCLOPROPENE COMPLEX COMPOSITIONS

(75) Inventors: Richard Martin Jacobson, Chalfont, PA (US); Philip John Ranly, Philadelphia, PA (US)

(73) Assignee: Rohm and Haas Company, Indianapolis, IN (US)

( * ) Notice: Subject to any disclaimer, the term of this patent is extended or adjusted under 35 U.S.C. 154(b) by 774 days.

(21) Appl. No.: 12/381,498

(22) Filed: Mar. 12, 2009

(65) Prior Publication Data

US 2009/0230350 A1 Sep. 17, 2009

Related U.S. Application Data

(60) Provisional application No. 61/069,324, filed on Mar. 13, 2008.

(51) Int. Cl.
| | |
|---|---|
| C09K 3/00 | (2006.01) |
| A61K 9/127 | (2006.01) |
| B01J 13/02 | (2006.01) |
| B01J 13/04 | (2006.01) |
| A01N 25/32 | (2006.01) |
| A01N 25/00 | (2006.01) |
| A01N 65/00 | (2009.01) |
| A01N 27/00 | (2006.01) |
| C07H 1/00 | (2006.01) |
| C08B 31/00 | (2006.01) |
| C08B 35/00 | (2006.01) |
| C07C 13/00 | (2006.01) |
| C07C 2/00 | (2006.01) |
| C07C 2/88 | (2006.01) |
| C08B 33/00 | (2006.01) |
| C07C 5/00 | (2006.01) |

(52) U.S. Cl.
USPC .... 252/182.12; 264/4.1; 504/103; 504/116.1; 504/189; 504/357; 514/23; 514/54; 514/58; 536/1.11; 536/102; 536/103; 585/350; 585/500; 585/638

(58) Field of Classification Search
USPC ............. 252/182.12; 264/4.1; 514/23, 54, 58; 536/1.11, 102, 103; 504/103, 116.1, 504/189, 357; 585/350, 500, 638
See application file for complete search history.

(56) References Cited

U.S. PATENT DOCUMENTS

| | | | | |
|---|---|---|---|---|
| 6,017,849 | A * | 1/2000 | Daly et al. | 504/114 |
| 6,426,319 | B1 | 7/2002 | Kostansek | |
| 6,953,540 | B2 | 10/2005 | Chong et al. | |
| 2002/0043730 | A1* | 4/2002 | Chong et al. | 264/4.1 |
| 2002/0061822 | A1* | 5/2002 | Kostansek | 504/357 |
| 2003/0100450 | A1 | 5/2003 | Kostansek | |
| 2005/0261131 | A1 | 11/2005 | Basel et al. | |
| 2005/0261132 | A1* | 11/2005 | Kostansek et al. | 504/353 |
| 2006/0003057 | A1* | 1/2006 | Kelly et al. | 426/118 |

OTHER PUBLICATIONS

1-Methylcyclopropene Wikipedia {en//.wikipedia.org/wiki/1-methylcyclopropene}.*
alpha-cyclodextrin ChemicalLand {chemicalland21.com/lifescience/foco/alpha-cyclodextrin.htm}.*
Challa et al AAPS PharmSciTech 2005 vol. 6 No. 2 pp. E329-E357.*
Rekharsky et al Chemical Reviews 1998 vol. 98 pp. 1875-1917.*
MeshMicron Conversion Chart Fluid Engineering (Circa 2002) {http://www.fluideng.lcom/FE/meshmicron.html}.*
Hawley's (Hawley's Condensed Chemical Dictionary 14the Ed. 2002 John Wiley and Sons Inc. Deliquescent and Hygroscopic entries).*
LipoTech (Calcium Chloride Product Specification May 11, 2007 {http://www.lipotech.com.ar/eng/user/FILE/Product/DT- 520-ESPEC- ING.pdf}).*
Hotchkiss, "Release of 1-Methylcylopropene from Heat-Pressed Polymer Films," J. Food Science, vol. 72, p. E330, (2007).

* cited by examiner

*Primary Examiner* — Patrick Ryan
*Assistant Examiner* — Aaron Greso
(74) *Attorney, Agent, or Firm* — Yung H. Lee; Krieg DeVault LLP

(57) ABSTRACT

There is provided a composition comprising
(a) one or more cyclopropene complex, and
(b) 0-10% water by weight based on the weight of said composition,
wherein the mole ratio of cyclopropene in said composition to molecular encapsulating agent in said composition is 0.92:1 or higher, or wherein the composition is in the form of a powder and, in a two-dimensional image of a representative sample of said powder, 20% or more of the area of the images of the particles of said cyclopropene complex, based on the area of all the images of all the particles of said cyclopropene complex in said image of said sample, is in the form of particles of said cyclopropene complex that have width dimension of 10 micrometers or larger. Also provided is a process for making a composition comprising cyclopropene complex.

16 Claims, No Drawings

CYCLOPROPENE COMPLEX COMPOSITIONS

This application claims the benefit of priority under 35 U.S.C. §119(e) of U.S. Provisional Patent Application No. 61/069,324 filed on Mar. 13, 2008.

BACKGROUND

It is often useful to provide a cyclopropene complex (i.e., one or more cyclopropene encapsulated by one or more molecular encapsulating agent). Cyclopropene complexes are sometimes made by dissolving molecular encapsulating agent in water and then introducing cyclopropene into the liquid solution. Usually, the water is then removed from the mixture so that the cyclopropene complex can be stored, transported, and handled as a powder. For example, U.S. Pat. No. 6,953,540 discloses a continuous method to prepare encapsulated cyclopropenes.

A common drawback to such previously-known processes is that the operation of removing water releases some of the cyclopropene from the cyclopropene complex. Cyclopropene that is released from the cyclopropene complex is normally lost, either through diffusion into the atmosphere, through decomposition due to collision with other molecules, through other mechanisms, or through a combination thereof. It is desired to provide compositions that contain cyclopropene complex, that contain low level of water, and that have high levels cyclopropene.

STATEMENT OF THE INVENTION

In a first aspect of the present invention, there is provided a composition comprising
(a) one or more cyclopropene complex, and
(b) 0-10% water by weight based on the weight of said composition,
wherein the mole ratio of cyclopropene in said composition to molecular encapsulating agent in said composition is 0.92:1 or higher.

In a second aspect of the present invention, there is provided a composition comprising
(a) 80% or more of one or more cyclopropene complex, by weight based on the weight of said composition, and
(b) 0-10% water, by weight based on the weight of said composition, wherein said composition is a powder
and wherein, in a two-dimensional image of a representative sample of said powder, 20% or more of the area of the images of the particles of said cyclopropene complex, based on the area of all the images of all the particles of said cyclopropene complex in said image of said sample, is in the form of particles of said cyclopropene complex that have width dimension of 10 micrometers or larger.

In a third aspect of the present invention, there is provided a process for making a composition comprising one or more cyclopropene complex, wherein said process comprises the steps of
(i) adding water, cyclopropene, and molecular encapsulating agent to a continuous reactor with residence time of 15 minutes or longer,
(ii) removing material from said continuous reactor, wherein said material comprises water and cyclopropene complex, and
(iii) subsequently removing water from said material to form said composition, wherein, after said step of removing water, the amount of water remaining in said composition is 0-10% by weight based on the weight of said composition.

DETAILED DESCRIPTION

As used herein, when a ratio is said to be "X:1 or higher," that ratio is considered to be any ratio of Y:1 where Y is greater than or equal to X.

The practice of the present invention involves the use of one or more cyclopropene. As used herein, "a cyclopropene" is any compound with the formula

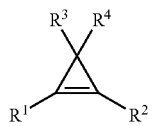

wherein each $R^1$, $R^2$, $R^3$ and $R^4$ is independently selected from the group consisting of H and a chemical group of the formula:

where n is an integer from 0 to 12. Each L is a bivalent radical. Suitable L groups include, for example, radicals containing one or more atoms selected from H, B, C, N, O, P, S, Si, or mixtures thereof. The atoms within an L group may be connected to each other by single bonds, double bonds, triple bonds, or mixtures thereof. Each L group may be linear, branched, cyclic, or a combination thereof. In any one R group (i.e., any one of $R^1$, $R^2$, $R^3$ and $R^4$) the total number of heteroatoms (i.e., atoms that are neither H nor C) is from 0 to 6. Independently, in any one R group the total number of non-hydrogen atoms is 50 or less. Each Z is a monovalent radical. Each Z is independently selected from the group consisting of hydrogen, halo, cyano, nitro, nitroso, azido, chlorate, bromate, iodate, isocyanato, isocyanido, isothiocyanato, pentafluorothio, and a chemical group G, wherein G is a 3 to 14 membered ring system.

The $R^1$, $R^2$, $R^3$, and $R^4$ groups are independently selected from the suitable groups. The $R^1$, $R^2$, $R^3$, and $R^4$ groups may be the same as each other, or any number of them may be different from the others. Among the groups that are suitable for use as one or more of $R^1$, $R^2$, $R^3$, and $R^4$ are, for example, aliphatic groups, aliphatic-oxy groups, alkylphosphonato groups, cycloaliphatic groups, cycloalkylsulfonyl groups, cycloalkylamino groups, heterocyclic groups, aryl groups, heteroaryl groups, halogens, silyl groups, other groups, and mixtures and combinations thereof. Groups that are suitable for use as one or more of $R^1$, $R^2$, $R^3$, and $R^4$ may be substituted or unsubstituted. Independently, groups that are suitable for use as one or more of $R^1$, $R^2$, $R^3$, and $R^4$ may be connected directly to the cyclopropene ring or may be connected to the cyclopropene ring through an intervening group such as, for example, a heteroatom-containing group.

Among the suitable $R^1$, $R^2$, $R^3$, and $R^4$ groups are, for example, aliphatic groups. Some suitable aliphatic groups include, for example, alkyl, alkenyl, and alkynyl groups. Suitable aliphatic groups may be linear, branched, cyclic, or a combination thereof. Independently, suitable aliphatic groups may be substituted or unsubstituted.

As used herein, a chemical group of interest is said to be "substituted" if one or more hydrogen atoms of the chemical group of interest is replaced by a substituent. It is contemplated that such substituted groups may be made by any method, including but not limited to making the unsubstituted form of the chemical group of interest and then performing a substitution. Suitable substituents include, for example, alkyl, alkenyl, acetylamino, alkoxy, alkoxyalkoxy, alkoxycarbonyl, alkoxyimio, carboxy, halo, haloalkoxy, hydroxy, alkylsulfonyl, alkylthio, trialkylsilyl, dialkylamino, and combinations thereof. An additional suitable substituent, which, if present, may be present alone or in combination with another suitable substituent, is -(L)$_m$-Z where m is 0 to 8, and where L and Z are defined herein above. If more than one substituent is present on a single chemical group of interest, each substituent may replace a different hydrogen atom, or one substituent may be attached to another substituent, which in turn is attached to the chemical group of interest, or a combination thereof.

Among the suitable $R^1$, $R^2$, $R^3$, and $R^4$ groups are, for example, substituted and unsubstituted aliphatic-oxy groups, such as, for example, alkenoxy, alkoxy, alkynoxy, and alkoxycarbonyloxy.

Also among the suitable $R^1$, $R^2$, $R^3$, and $R^4$ groups are, for example, substituted and unsubstituted alkylphosphonato, substituted and unsubstituted alkylphosphato, substituted and unsubstituted alkylamino, substituted and unsubstituted alkylsulfonyl, substituted and unsubstituted alkylcarbonyl, and substituted and unsubstituted alkylaminosulfonyl, including, for example, alkylphosphonato, dialkylphosphato, dialkylthiophosphato, dialkylamino, alkylcarbonyl, and dialkylaminosulfonyl.

Also among the suitable $R^1$, $R^2$, $R^3$, and $R^4$ groups are, for example, substituted and unsubstituted cycloalkylsulfonyl groups and cycloalkylamino groups, such as, for example, dicycloalkylaminosulfonyl and dicycloalkylamino.

Also among the suitable $R^1$, $R^2$, $R^3$, and $R^4$ groups are, for example, substituted and unsubstituted heterocyclyl groups (i.e., aromatic or non-aromatic cyclic groups with at least one heteroatom in the ring).

Also among the suitable $R^1$, $R^2$, $R^3$, and $R^4$ groups are, for example, substituted and unsubstituted heterocyclyl groups that are connected to the cyclopropene compound through an intervening oxy group, amino group, carbonyl group, or sulfonyl group; examples of such $R^1$, $R^2$, $R^3$, and $R^4$ groups are heterocyclyloxy, heterocyclylcarbonyl, diheterocyclylamino, and diheterocyclylaminosulfonyl.

Also among the suitable $R^1$, $R^2$, $R^3$, and $R^4$ groups are, for example, substituted and unsubstituted aryl groups. Suitable substituents are those described herein above. In some embodiments, one or more substituted aryl group is used in which at least one substituent is one or more of alkenyl, alkyl, alkynyl, acetylamino, alkoxyalkoxy, alkoxy, alkoxycarbonyl, carbonyl, alkylcarbonyloxy, carboxy, arylamino, haloalkoxy, halo, hydroxy, trialkylsilyl, dialkylamino, alkylsulfonyl, sulfonylalkyl, alkylthio, thioalkyl, arylaminosulfonyl, and haloalkylthio.

Also among the suitable $R^1$, $R^2$, $R^3$, and $R^4$ groups are, for example, substituted and unsubstituted heterocyclic groups that are connected to the cyclopropene compound through an intervening oxy group, amino group, carbonyl group, sulfonyl group, thioalkyl group, or aminosulfonyl group; examples of such $R^1$, $R^2$, $R^3$, and $R^4$ groups are diheteroarylamino, heteroarylthioalkyl, and diheteroarylaminosulfonyl.

Also among the suitable $R^1$, $R^2$, $R^3$, and $R^4$ groups are, for example, hydrogen, fluoro, chloro, bromo, iodo, cyano, nitro, nitroso, azido, chlorato, bromato, iodato, isocyanato, isocyanido, isothiocyanato, pentafluorothio; acetoxy, carboethoxy, cyanato, nitrato, nitrito, perchlorato, allenyl; butylmercapto, diethylphosphonato, dimethylphenylsilyl, isoquinolyl, mercapto, naphthyl, phenoxy, phenyl, piperidino, pyridyl, quinolyl, triethylsilyl, trimethylsilyl; and substituted analogs thereof.

As used herein, the chemical group G is a 3 to 14 membered ring system. Ring systems suitable as chemical group G may be substituted or unsubstituted; they may be aromatic (including, for example, phenyl and napthyl) or aliphatic (including unsaturated aliphatic, partially saturated aliphatic, or saturated aliphatic); and they may be carbocyclic or heterocyclic. Among heterocyclic G groups, some suitable heteroatoms are, for example, nitrogen, sulfur, oxygen, and combinations thereof. Ring sysytems suitable as chemical group G may be monocyclic, bicyclic, tricyclic, polycyclic, spiro, or fused; among suitable chemical group G ring systems that are bicyclic, tricyclic, or fused, the various rings in a single chemical group G may be all the same type or may be of two or more types (for example, an aromatic ring may be fused with an aliphatic ring).

In some embodiments, G is a ring system that contains a saturated or unsaturated 3 membered ring, such as, for example, a substituted or unsubstituted cyclopropane, cyclopropene, epoxide, or aziridine ring.

In some embodiments, G is a ring system that contains a 4 membered heterocyclic ring; in some of such embodiments, the heterocyclic ring contains exactly one heteroatom. Independently, in some embodiments, G is a ring system that contains a heterocyclic ring with 5 or more members; in some of such embodiments, the heterocyclic ring contains 1 to 4 heteroatoms. Independently, in some embodiments, the ring in G is unsubstituted; in other embodiments, the ring system contains 1 to 5 substituents; in some of the embodiments in which G contains substituents, each substituent is independently chosen from the substituents described herein above. Also suitable are embodiments in which G is a carbocyclic ring system.

In some embodiments, each G is independently a substituted or unsubstituted phenyl, pyridyl, cyclohexyl, cyclopentyl, cycloheptyl, pyrolyl, furyl, thiophenyl, triazolyl, pyrazolyl, 1,3-dioxolanyl, or morpholinyl. Among these embodiments include those embodiments, for example, in which G is unsubstituted or substituted phenyl, cyclopentyl, cycloheptyl, or cyclohexyl. In some of these embodiments, G is cyclopentyl, cycloheptyl, cyclohexyl, phenyl, or substituted phenyl. Among embodiments in which G is substituted phenyl are embodiments, for example, in which there are 1, 2, or 3 substituents. Independently, also among embodiments in which G is substituted phenyl are embodiments, for example, in which the substituents are independently selected from methyl, methoxy, and halo.

Also contemplated are embodiments in which $R^3$ and $R^4$ are combined into a single group, which is attached to the number 3 carbon atom of the cyclopropene ring by a double bond. Some of such compounds are described in US Patent Publication 2005/0288189.

In some embodiments, one or more cyclopropenes are used in which one or more of $R^1$, $R^2$, $R^3$, and $R^4$ is hydrogen. In some embodiments, $R^1$ or $R^2$ or both $R^1$ and $R^2$ is hydrogen. Independently, in some embodiments, $R^3$ or $R^4$ or both $R^3$ and $R^4$ is hydrogen. In some embodiments, $R^2$, $R^3$, and $R^4$ are hydrogen.

In some embodiments, one or more of $R^1$, $R^2$, $R^3$, and $R^4$ is a structure that has no double bond. Independently, in some embodiments, one or more of $R^1$, $R^2$, $R^3$, and $R^4$ is a structure that has no triple bond. Independently, in some embodiments, one or more of $R^1$, $R^2$, $R^3$, and $R^4$ is a structure that has no halogen atom substituent. Independently, in some embodiments, one or more of $R^1$, $R^2$, $R^3$, and $R^4$ is a structure that has no substituent that is ionic.

In some embodiments, one or more of $R^1$, $R^2$, $R^3$, and $R^4$ is hydrogen or ($C_1$-$C_{10}$) alkyl. In some embodiments, each of $R^1$, $R^2$, $R^3$, and $R^4$ is hydrogen or ($C_1$-$C_8$) alkyl. In some embodiments, each of $R^1$, $R^2$, $R^3$, and $R^4$ is hydrogen or ($C_1$-$C_4$) alkyl. In some embodiments, each of $R^1$, $R^2$, $R^3$, and $R^4$ is hydrogen or methyl. In some embodiments, $R^1$ is ($C_1$-$C_4$) alkyl and each of $R^2$, $R^3$, and $R^4$ is hydrogen. In some embodiments, $R^1$ is methyl and each of $R^2$, $R^3$, and $R^4$ is hydrogen, and the cyclopropene is known herein as 1-methylcyclopropene ("1-MCP").

In some embodiments, a cyclopropene is used that has boiling point at one atmosphere pressure of 50° C. or lower; or 25° C. or lower; or 15° C. or lower. Independently, in some embodiments, a cyclopropene is used that has boiling point at one atmosphere pressure of –100° C. or higher; –50° C. or higher; or –25° C. or higher; or 0° C. or higher.

The practice of the present invention involves the use of one or more molecular encapsulating agent. Suitable molecular encapsulating agents include, for example, organic and inorganic molecular encapsulating agents. Suitable organic molecular encapsulating agents include, for example, substituted cyclodextrins, unsubstituted cyclodextrins, and crown ethers. Suitable inorganic molecular encapsulating agents include, for example, zeolites. The preferred molecular encapsulating agent will vary depending upon the structure of the cyclopropene or cyclopropenes being used.

In some embodiments, the molecular encapsulating agent contains one or more cyclodextrin. In some embodiments, every molecular encapsulating agent that is used is a cyclodextrin.

Cyclodextrins are compounds whose molecules are cone-shaped structures that have structures that are made from 6 or more glucose units. As used herein, a statement that a cyclodextrin is made from certain glucose units is to be understood as a description of the structure of the cyclodextrin molecule, which may or may not be actually made by reacting those certain glucose molecules. Cyclodextrins may be made from as many as 32 glucose units. Cyclodextrins that are made from 6, 7, and 8 glucose units are known, respectively, as alpha-cyclodextrin, beta-cyclodextrin, and gamma-cyclodextrin. Some cyclodextrins are available, for example, from Wacker Biochem Inc., Adrian, Mich., as well as other vendors.

Independent of the number of glucose units in the cyclodextrin, the class of compounds called "cyclodextrins" is considered herein to also include derivatives of cyclodextrin molecules. That is, the term "cyclodextrin" applies herein to molecules that are cone-shaped structures that have structures that are made from 6 or more glucose units and also applies to derivatives of such molecules, when such derivatives are capable of performing as molecular encapsulating agents. Some suitable derivatives are, for example, molecules that have a structure that is (or could be) formed by addition of an alkyl group (such as, for example, a methyl group) to a cyclodextrin. Some other derivatives are, for example, molecules that have a structure that is (or could be) formed by addition of a hydroxyalkyl group (such as, for example, a hydroxypropyl group) to a cyclodextrin. Some derivatives that are considered "cyclodextrins" are, for example, partially methylated-beta-cyclodextrin and partially hydroxypropylated-alpha-cyclodextrin.

In some embodiments, exactly one of alpha-cyclodextrin, beta-cyclodextrin, or gamma-cyclodextrin is used. In some embodiments, a mixture of two or more of alpha-cyclodextrin, beta-cyclodextrin, and gamma-cyclodextrin is used. In some embodiments, alpha-cyclodextrin is used. In some embodiments, no molecular encapsulating agent other than alpha-cyclodextrin is used.

Mixtures of suitable molecular encapsulating agents are also suitable.

The present invention involves one or more cyclopropene complex. A cyclopropene complex is a composition in which one or more molecular encapsulating agent encapsulates one or more cyclopropene or a portion of one or more cyclopropene.

In some embodiments, at least one cyclopropene complex is an inclusion complex. In such an inclusion complex, the molecular encapsulating agent forms a cavity, and the cyclopropene or a portion of the cyclopropene is located within that cavity. In some of such inclusion complexes, there is no covalent bonding between the cyclopropene and the molecular encapsulating agent. Independently, in some of such inclusion complexes, there is no ionic bonding between the cyclopropene and the molecular encapsulating complex, whether or not there is any electrostatic attraction between one or more polar moiety in the cyclopropene and one or more polar moiety in the molecular encapsulating agent.

Independently, in some of such inclusion complexes, the interior of the cavity of the molecular encapsulating agent is substantially apolar or hydrophobic or both, and the cyclopropene (or the portion of the cyclopropene located within that cavity) is also substantially apolar or hydrophobic or both. While the present invention is not limited to any particular theory or mechanism, it is contemplated that, in such apolar cyclopropene complexes, van der Waals forces, or hydrophobic interactions, or both, cause the cyclopropene molecule or portion thereof to remain within the cavity of the molecular encapsulating agent.

The cyclopropene complex can usefully be characterized by the ratio of moles of molecular encapsulating agent to moles of cyclopropene. The mole ratio of cyclopropene to molecular encapsulating agent is 0.92:1 or higher. In some embodiments, the mole ratio of cyclopropene to molecular encapsulating agent is 0.95:1 or higher; or 0.97:1 or higher; or 0.98:1 or higher. Independently, in some embodiments, the mole ratio of cyclopropene to molecular encapsulating agent is 1.5 or lower; or 1.2 or lower; or 1.0 or lower.

The composition of the present invention contains water in the amount of 0-10% by weight based on the weight of the composition. Some embodiments contain 0% water. In some embodiments, the amount of water, by weight based on the weight of the composition, is 8% or less; or 6% or less. Independently, in some embodiments, the amount of water, by weight based on the weight of the composition, is 2% or more; or 4% or more.

In some embodiments, the amount of cyclopropene complex in the composition of the present invention, by weight based on the weight of the composition, is 50% or higher; or 80% or higher; or 90% or higher.

It is sometimes useful to characterize compositions of the present invention by determining the sum of the weight of water and the weight of cyclopropene complex. In some embodiments, the amount of that sum is 98% or more, or 99% or more, based on the weight of the composition.

In some embodiments (herein called "powder embodiments") of the present invention, the composition is in the form a powder, and the amount of cyclopropene complex in the composition is 80% or more by weight based on the weight of the composition.

It is sometimes useful to characterize the particles in a powder embodiment by observing the size of the powder particles. One useful method is the "image area" method, which is performed as follows. A representative sample of the powder of interest is spread out upon a flat surface so that all or nearly all of the particles are not overlapping any other particle. The particles are then observed, for example by making a two-dimensional image of the particles, for example by optical microscopy. The image of each particle is observed, and the area of the image of each particle is recorded.

Additionally, the image of each particle is observed to determine its width dimension, which is defined herein as the length of the shortest radial line segment of the image of that particle. A "radial line segment" as used herein is a line segment that passes through the geometric center of the image of the particle and that has its endpoints on the perimeter of the image of the particle.

As used herein, the breadth dimension of the image of a particle is defined herein as the length of the radial line segment of the image of the particle that is perpendicular to the shortest radial line segment. In some cases, the image of a particle is rectangular or nearly rectangular, and a useful estimate of the area of the image is formed by multiplying the width dimension times the breadth dimension.

One useful way to characterize a sample of powder is to observe the percentage of the area of the image of the sample that is in the form of relatively large size particles. In some embodiments of the present invention, 20% or more of the area of the image of the particles in the sample, based on the total area of all the images of all the particles in the sample, is in the form of particles that have width dimension of 10 micrometers or larger. In some embodiments, the amount of the area of the image of the particles in the sample that is in the form of particles that have width dimension of 10 micrometers or larger, is, based on the total area of all of the images of all of the particles in the sample, 30% or more, or 50% or more; or 75% or more; or 85% or more. In some embodiments, the amount of the area of the image of the particles in the sample that is in the form of particles that have width dimension of 20 micrometers or larger, is, based on the total area of all of the images of all of the particles in the sample 20% or more; or 30% or more, or 50% or more; or 75% or more; or 85% or more. In some embodiments, the amount of the area of the image of the particles in the sample that is in the form of particles that have width dimension of 50 micrometers or larger, is, based on the total area of all the particles in the sample, 20% or more; or 30% or more, or 50% or more; or 75% or more; or 85% or more.

The particles in the sample will have some depth dimension, measured perpendicular to the plane of the image. While not limiting the present invention to any particular assumption about the depth dimension of the particles, it is contemplated that the image areas of the particles, as defined above, will correlate with the volumes and the masses of the particles. Therefore it is contemplated that the image area method as defined above will provide a useful assessment of collections of particles in which a relatively large amount of the mass or volume of the sample exists in the form of relatively large particles.

The vessel in which formation of cyclopropene complex takes place is known herein as the "reactor."

In some embodiments, the present invention involves making cyclopropene complex using a continuous method. In a continuous method, at least one ingredient is added to the reactor at the same time that cyclopropene complex is removed from the reactor. A reactor in which a continuous process is conducted is referred to herein as a "continuous reactor." Addition of each ingredient may, independently, be continuous or may be occasionally interrupted. Removal of cyclopropene complex may be continuous or may be occasionally interrupted. In continuous embodiments, ingredients are added to the reactor in one or more streams. Each stream may contain one ingredient or a mixture of two or more ingredients.

Water and molecular encapsulating agent are added to the continuous reactor. Water and molecular encapsulating agent may be added separately or as a solution or slurry of molecular encapsulating agent in water. If a solution or slurry of molecular encapsulating agent in water is used, additional water, or additional molecular encapsulating agent, or both, may optionally be added separately from the solution or slurry. If a solution or slurry is used, the concentration of molecular encapsulating agent in the solution or slurry may be less than, equal to, or greater than the solubility of the molecular encapsulating agent in water at the temperature of the reactor.

Cyclopropene is also added to the continuous reactor. Cyclopropene may be added by any method. In some embodiments, cyclopropene is gaseous at the temperature of the reactor. In some embodiments, the reactor contains some liquid, and one suitable method of adding gaseous cyclopropene to the reactor is to force gaseous cyclopropene using excess pressure into the reactor at a point below the surface of the liquid in the reactor.

Optionally, additional ingredients (i.e., ingredients other than cylopropene, molecular encapsulating agent, and water) may be added to the reactor. For example, if the product of the process will be a powder, material may be added to the reactor that will improve the ability of that powder to flow properly. In some embodiments, no additional ingredients are added to the reactor.

It is contemplated that cyclopropene complex will be formed in the reactor.

Cyclopropene complex and water are removed continuously, optionally with occasional interruptions. It is contemplated that other materials may also be removed continuously, such as, for example, cyclopropene that does not enter into a cyclopropene complex, molecular encapsulating agent that does not enter into a cyclopropene complex, impurities (if any are present), byproducts (if any are formed), additional ingredients (if any), other materials, and mixtures thereof.

It is useful to characterize a continuous reactor by the volume addition rate (i.e., the rate of addition of all materials that are added to the reactor, expressed in units of volume per unit of time). It is also useful to characterize a continuous reactor by the volume removal rate (i.e., the rate of removal of all materials that are removed from the reactor, expressed in units of volume per unit of time). It is contemplated that volume addition rate and the volume removal rate may each fluctuate, possibly independently of each other, by relatively small amounts and that the rates discussed herein are average values.

In some embodiments (herein called "volume steady" embodiments), a continuous reactor is operated for a period of time during which the volume addition rate equals the volume removal rate. In such embodiments, the reactor can be characterized by the "residence time," which is calculated by dividing the volume of the contents of the reactor by the volume addition rate. The volume addition rate is considered herein to "equal" the volume removal rate even if the two rates are not exactly equal, if the inequality between the two rates does not cause any consequential change in the volume of the contents of the reactor. As used herein, a consequential change in the volume of the contents of the reactor is a change of 5% or more, either an increase or a decrease, based on the volume of the contents of the reactor.

In some volume steady embodiments of the present invention, cyclopropene complex is made in a continuous reactor that has residence time of 15 minutes or longer; or 1 hour or longer; or 2 hours or longer; or 4 hours or longer. Independently, in some embodiments, cyclopropene complex is made in a continuous reactor that has residence time of 24 hours or shorter; or 10 hours or shorter.

In some volume steady embodiments, various other parameters of the process are also constant, such as, for example, temperature, concentration of each ingredient, and concentration of cyclopropene complex.

In some volume steady embodiments, at the beginning of the process, one or more of the conditions of the process (temperature of the reactor contents, concentration of ingredients, concentration of cyclopropene complex, flow rates, or combination thereof) has a value different from the value it will attain when the volume-steady condition is reached. It is contemplated that once the volume-steady condition is attained, the process will be operated for a significant duration of time at that condition. In some embodiments, most or all of the cyclopropene complex that is used is produced while the reactor is in the volume-steady condition.

In some volume steady embodiments, the ratio of the molar rate of addition (i.e., moles per unit of time) of cyclopropene to the molar rate of addition of molecular encapsulating agent is 0.92:1 or higher; or 1.0:1 or higher; or 1.1:1 or higher. Independently, in some embodiments, the ratio of the molar rate of addition of cyclopropene to the molar rate of addition of molecular encapsulating agent is 1.5:1 or lower; or 1.2:1 or lower.

In some embodiments of the present invention, material containing cyclopropene complex and water is removed from the reactor. In some embodiments, that material is dried (i.e., treated to separate water from the material). Any method of drying may be used. Some suitable methods of drying include, for example, one or more mechanical method, one or more solvent method, one or more vacuum method, one or more dry-gas method, and combinations thereof.

Some suitable mechanical methods of drying include, for example, vacuum filtration, other filtration methods, centrifugation, other mechanical methods, and combinations thereof.

Some suitable solvent methods of drying include, for example, washing with water-soluble solvent (i.e., exposing the material to water-soluble solvent and then removing the solvent along with water dissolved in the solvent). Suitable water-soluble solvents include, for example, water-soluble alcohols, water-soluble ketones, and mixtures thereof. In some embodiments, a solvent method of drying is used that includes washing with methanol or acetone or a mixture thereof. In some embodiments, a solvent method of drying is used that includes washing with acetone.

Dry-gas methods of drying involve exposing the material to gas that has relatively low water content (i.e., has relative humidity of 50% or lower). The gas may be, for example, air or nitrogen or other gas or a mixture thereof, as long as the gas has relatively low water content. In some embodiments, nitrogen is used. The gas may be at any temperature. The gas may be forced to move relative to the material being dried, or the gas may be at rest. In some embodiments, the material to be dried is brought into contact with gas when the gas is at temperature of 20° C. or higher; or 50° C. or higher; or 100° C. or higher. Independently, in some embodiments, the material to be dried is brought into contact with gas when the gas is at temperature of 150° C. or lower.

In some embodiments, drying is conducted by using a one or more of a mechanical method of drying, a solvent method of drying, a vacuum method of drying, a dry gas method of drying, or a combination thereof.

In some embodiments, it is contemplated that the reactor will be agitated, for example by stirring.

In the process of making cyclopropene complex, other appropriate operations, such as, for example, adjustment of temperature, other operations, and combinations thereof, may be performed, either continuously or intermittently.

It is to be understood that for purposes of the present specification and claims that each operation disclosed herein is performed at 20° C. unless otherwise specified.

EXAMPLES

Comparative Example C1

Into a stirred solution consisting of 1 part commercial alpha-cyclodextrin and 9 parts water was bubbled 1-methylcyclopropene at a rate such that encapsulation reaction was complete in 30 minutes. The resulting slurry was dewatered, washed with acetone, and dried with heated nitrogen to yield dry 1-methylcyclopropene/alpha-cyclodextrin complex containing 4.1% water and 4.2% 1-methylcyclopropene by weight. This represents a mole ratio of cyclopropene to encapsulating agent of 0.82:1. A representative sample was photographed by optical microscopy. The breadth and width of all of the crystals in the field were measured. Crystals with a width greater than 10.0 microns constituted 19% of the total crystal area in the field.

Example 2

Into a stirred solution consisting of 1 part commercial alpha-cyclodextrin and 9 parts water was bubbled 1-methylcyclopropene at a rate such that encapsulation reaction was complete in 90 minutes. After this startup, a continuous feed of the alpha-cyclodextrin solution was initiated at a rate to achieve an average residence time of 90 minutes. The reacted slurry was removed at the same rate. After 3 hours, the resulting slurry was dewatered, washed with acetone, and dried with heated nitrogen to yield dry 1-methylcyclopropene/alpha-cyclodextrin complex containing 5.0% water and 4.8% 1-methylcyclopropene by weight. This represents a mole ratio of cyclopropene to encapsulating agent of 0.96:1. A representative sample was photographed by optical microscopy. The breadth and width of all of the crystals in the field were measured. Crystals with a width greater than 10.0 microns constituted 89% of the total crystal area in the field.

We claim:
1. A composition comprising
  (a) one or more cyclopropene complex in which one or more molecular encapsulating agent encapsulates one or more cyclopropene or a portion of one or more cyclopropene, and
  (b) water, wherein the amount of water in said composition is 0-6% by weight based on the weight of said composition,
    wherein the mole ratio of cyclopropene to molecular encapsulating agent in said complex is 0.92:1 or higher.
2. The composition of claim 1, wherein the mole ratio of said cyclopropene to said molecular encapsulating agent is 0.95:1 or higher.

3. The composition of claim 1, wherein said cyclopropene complex comprises 1-methyl cyclopropene and alpha-cyclodextrin.

4. A composition comprising
(a) 80% or more of one or more cyclopropene complex in which one or more molecular encapsulating agent encapsulates one or more cyclopropene or a portion of one or more cyclopropene, by weight based on the weight of said composition, and
(b) 0-10% water, by weight based on the weight of said composition, wherein said composition is a powder, and wherein, in a two-dimensional image of a representative sample of said powder, 20% or more of the area of the images of the particles of said cyclopropene complex, based on the area of all the images of all the particles of said cyclopropene complex in said image of said sample, is in the form of particles of said cyclopropene complex that have width dimension of 10 micrometers or larger, wherein the mole ratio of cyclopropene to molecular encapsulating agent in said complex is 0.92:1 or higher.

5. The composition of claim 4, wherein said cyclopropene complex comprises 1-methyl cyclopropene and alpha-cyclodextrin.

6. The composition of claim 1, wherein said composition is made by a process comprising the steps of
(i) adding water, cyclopropene, and molecular encapsulating agent to a continuous reactor with residence time of 15 minutes or longer,
(ii) removing material from said continuous reactor, wherein said material comprises water and cyclopropene complex, and
(iii) subsequently removing water from said material to form said composition, wherein, after said step of removing water, the amount of water remaining in said composition is 0-6% by weight based on the weight of said composition.

7. The composition of claim 6, wherein the mole ratio of said cyclopropene to said molecular encapsulating agent is 0.95:1 or higher.

8. The composition of claim 4, wherein said composition is made by a process comprising the steps of
(i) adding water, cyclopropene, and molecular encapsulating agent to a continuous reactor with residence time of 15 minutes or longer,
(ii) removing material from said continuous reactor, wherein said material comprises water and cyclopropene complex, and
(iii) subsequently removing water from said material to form said composition, wherein, after said step of removing water, the amount of water remaining in said composition is 0-10% by weight based on the weight of said composition.

9. The composition of claim 8, wherein the mole ratio of said cyclopropene to said molecular encapsulating agent is 0.95:1 or higher.

10. The composition of claim 9, wherein, after said step of removing water, the amount of water remaining in said composition is 0-6% by weight based on the weight of said composition.

11. The composition of claim 4, wherein the mole ratio of said cyclopropene to said molecular encapsulating agent is 0.95:1 or higher.

12. The composition of claim 4, wherein the amount of water in said composition is 0-6% by weight based on the weight of said composition.

13. The composition of claim 1, wherein the amount of water in said composition is 2-6% by weight based on the weight of said composition.

14. The composition of claim 4, wherein the amount of water in said composition is 2-8% by weight based on the weight of said composition.

15. The composition of claim 6, wherein, after said step of removing water, the amount of water remaining in said composition is 2-6% by weight based on the weight of said composition.

16. The composition of claim 8, wherein, after said step of removing water, the amount of water remaining in said composition is 2-8% by weight based on the weight of said composition.

* * * * *